(12) United States Patent
Borhan et al.

(10) Patent No.: US 12,195,020 B2
(45) Date of Patent: Jan. 14, 2025

(54) REINFORCEMENT LEARNING CONTROL OF VEHICLE SYSTEMS

(71) Applicant: Cummins Inc., Columbus, IN (US)

(72) Inventors: Hoseinali Borhan, Bloomington, IN (US); Abbas Hooshmand Salemian, Campbell, CA (US); Edmund P. Hodzen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 67 days.

(21) Appl. No.: 16/906,674

(22) Filed: Jun. 19, 2020

(65) Prior Publication Data

US 2020/0398859 A1    Dec. 24, 2020

Related U.S. Application Data

(60) Provisional application No. 62/864,211, filed on Jun. 20, 2019.

(51) Int. Cl.
*F01N 3/20*     (2006.01)
*B60W 30/14*    (2006.01)
(Continued)

(52) U.S. Cl.
CPC ............ *B60W 50/06* (2013.01); *B60W 30/14* (2013.01); *F01N 3/2066* (2013.01); *F01N 3/208* (2013.01);
(Continued)

(58) Field of Classification Search
CPC ..... B60W 2050/0088; B60W 2552/20; B60W 30/14; B60W 30/18009; B60W 50/0097;
(Continued)

(56) References Cited

U.S. PATENT DOCUMENTS 6,324,530 B1   11/2001 Yamaguchi et al.
7,552,007 B2    6/2009 Dudek
(Continued)

FOREIGN PATENT DOCUMENTS

WO    WO-2021/091543    5/2021

OTHER PUBLICATIONS

PCT Search Report and Written Opinion for PCT PCT/US2022/044145 mailed Jan. 18, 2023, 10 pages.

*Primary Examiner* — Phutthiwat Wongwian
*Assistant Examiner* — Diem T Tran
(74) *Attorney, Agent, or Firm* — Foley & Lardner LLP (57) ABSTRACT

A system includes a sensor array and a processing circuit. The processing circuit is operable to: store a policy; receive the sensor information from the sensor array; receive horizon information from a horizon system; input the sensor information and the horizon information into the policy; determine an output of the policy based on the input of the sensor information and the horizon information; control operation of a vehicle system according to the output; compare the sensor information received after controlling operation of the vehicle system according to the output relative to a reward or penalty condition; provide one of a reward signal or a penalty signal in response to the comparison; update the policy based on receipt of the reward signal or the penalty signal; and control the vehicle system using the updated policy to improve operation in view of the operating parameter.

12 Claims, 3 Drawing Sheets

(51) Int. Cl.
*B60W 50/06* (2006.01)
*F02D 33/00* (2006.01)
*F02D 41/00* (2006.01)
*G05B 13/02* (2006.01)

(52) U.S. Cl.
CPC ......... *F02D 33/00* (2013.01); *F02D 41/0002* (2013.01); *G05B 13/0265* (2013.01); *F01N 2610/02* (2013.01); *F01N 2610/1453* (2013.01)

(58) Field of Classification Search
CPC .............. B60W 50/06; F01N 2560/021; F01N 2560/026; F01N 2610/02; F01N 2610/1453; F01N 3/2066; F01N 9/00; F02D 2200/701; F02D 33/00; F02D 41/0002; F02D 41/021; F02D 41/1405; F02D 41/2487; G05B 13/0265; Y02A 50/20; Y02T 10/12; Y02T 10/40
See application file for complete search history.

(56) References Cited

U.S. PATENT DOCUMENTS

| | | | |
|---|---|---|---|
| 7,741,961 B1* | 6/2010 | Rafii | G06T 7/20 348/148 |
| 7,774,127 B2 | 8/2010 | Prunier | |
| 7,954,579 B2 | 6/2011 | Rodriguez et al. | |
| 8,612,107 B2 | 12/2013 | Malikopoulos | |
| 2015/0005994 A1 | 1/2015 | Kumar et al. | |
| 2015/0094939 A1 | 4/2015 | D'Amato et al. | |
| 2016/0091323 A1* | 3/2016 | MacGougan | G01C 21/3697 701/400 |
| 2016/0297435 A1 | 10/2016 | D'Amato et al. | |
| 2016/0328976 A1 | 11/2016 | Jo et al. | |
| 2017/0168466 A1 | 6/2017 | Sun et al. | |
| 2018/0299884 A1* | 10/2018 | Morita | G05D 1/0022 |
| 2018/0340785 A1* | 11/2018 | Upadhyay | F01N 9/002 |
| 2019/0378036 A1 | 12/2019 | Tuzi et al. | |
| 2019/0378042 A1 | 12/2019 | Tuzi et al. | |
| 2020/0072629 A1* | 3/2020 | Balakrishna | G01C 21/3484 |
| 2020/0369284 A1 | 11/2020 | Chen et al. | |

* cited by examiner

REINFORCEMENT LEARNING CONTROL OF VEHICLE SYSTEMS

CROSS-REFERENCE TO RELATED APPLICATION

The application claims the benefit of and priority to U.S. Provisional Patent Application No. 62/864,211 filed on Jun. 20, 2019, which is incorporated by reference herein in its entirety.

TECHNICAL FIELD

The present disclosure relates to control systems for vehicles. More particularly, the present disclosure relates to systems and methods for using machine learning to improve control of vehicle systems.

BACKGROUND

Reinforcement learning is an area of machine learning. Reinforcement learning involves setting a goal for a system or agent, then allowing the agent to implement and update a policy to meet the goal. The agent implements the policy and in turn receives a reward when successful and no reward or a penalty when unsuccessful. With repeated iterations of rewards and/or penalties, the policy is updated to achieve a maximum incidence of reward. In this way, the agent continues to improve the policy in an ongoing manner over time. Reinforcement learning is limited primarily to the field of robotics where system constraints (e.g., processing power, memory storage, size, etc.) are not as applicable. Use of reinforcement learning in other fields has not been widely adopted.

SUMMARY

One embodiment relates to a system. The system includes a sensor array structured to provide sensor information indicative of an operating parameter. The system also includes a processing circuit coupled to the sensor array, the processing circuit comprising one or more memory devices coupled to one or more processors, the one or more memory devices configured to store instructions thereon. When the instructions are executed by the one or more processors, the one or more processors: store a policy in the one or more memory devices; receive the sensor information from the sensor array; receive horizon information from a horizon system; input the sensor information and the horizon information into the policy; determine an output of the policy based on the input of the sensor information and the horizon information; control operation of a vehicle system according to the output; compare the sensor information received after controlling operation of the vehicle system according to the output relative to a reward or penalty condition; provide one of a reward signal or a penalty signal in response to the comparison; update the policy based on receipt of the reward signal or the penalty signal; and control the vehicle system using the updated policy to improve operation in view of the operating parameter.

Another embodiment relates to a system. The system includes a vehicle system; a sensor array coupled to the vehicle system, the sensor array structured to provide sensor information; and a processing circuit comprising one or more memory devices coupled to one or more processors. The one or more memory devices are configured to store instructions thereon that, when executed by the one or more processors, cause the one or more processors to: store a policy in the one or more memory devices; receive the sensor information from the sensor array; receive age information indicating an operational age of the vehicle system; input the sensor information and the age information into the policy; determine an output of the policy based on the input of the sensor information and the age information; control operation of the vehicle system according to the output; compare the sensor information received after controlling operation of the vehicle system according to the output to a reward or penalty condition; provide one of a reward signal or a penalty signal in response to the comparison; and update the policy based on receipt of the reward signal or the penalty signal.

Another embodiment relates to a system that includes a first vehicle system associated with a first vehicle and including a first sensor array structured to provide first sensor information. The system also includes a second vehicle system associated with a second vehicle and including a second sensor array structured to provide second sensor information. The system further includes one or more memory devices configured to store instructions thereon that, when executed by one or more processors, cause the one or more processors to: store a policy in the one or more memory devices; receive the first sensor information and the second sensor information; input the first sensor information and the second sensor information into the policy; determine an output of the policy based on the input of the first sensor information and the second sensor information; control operation of the first vehicle system according to the output; compare the first sensor information received after controlling operation of the first vehicle system according to the output to a reward or penalty condition; provide one of a reward signal or a penalty signal in response to the comparison; and update the policy based on receipt of the reward signal or the penalty signal.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for utilizing machine learning to tune and operate vehicle systems. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for utilizing machine learning, and more particularly reinforcement learning control, in vehicle control. A controller is identified as an agent in a reinforcement learning scheme and is provided initially with a base policy for control. The controller then institutes the base policy on a vehicle system, which is identified as an environment. Vehicle system sensors record, measure, predict, determine, and/or observe the response of the vehicle system to the base policy. The observations are analyzed by the controller (for example, via comparison to a defined goal or a stored database of results) and a reward is received when a desirable result is achieved in the environment. The controller updates the base policy each time an observation is made so that the policy trends toward desirable results and the policy is updated in view of the results observed in the environment. The use of machine learning allows the vehicle system to update the control policy based on received real world results or based on the particular arrangement of a vehicle. In this way, initial tuning can be improved and ongoing system control can account for changing operating conditions of components within the vehicle system.

Embodiments include utilizing supervised learning methods such as Support Vector Machine (SVM), Logistic Regression (LR), typical system identification and time series methods, Neural Networks, and Deep Neural Networks. Additionally, the policy can be changed using any optimization or deep learning methods. For example, dynamic programming, iterative logarithmic-quadratic proximal (LQP), quadratic proximal (QP), recency policy gradient, and Q-learning.

Figure 1:
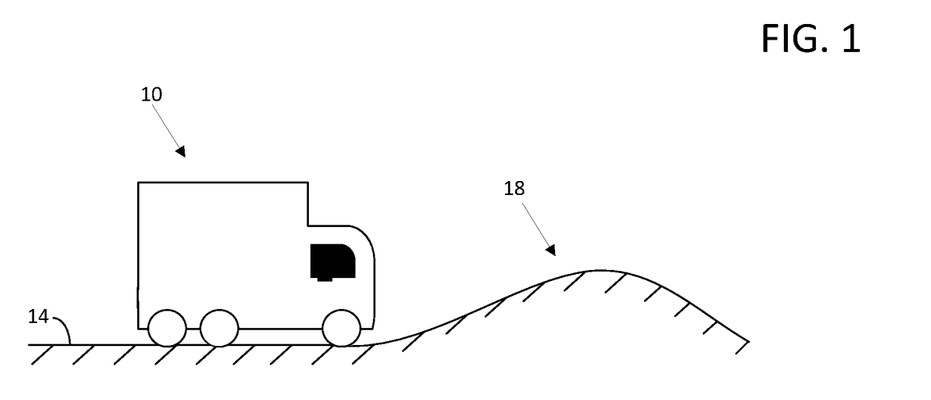
FIG. 1 is a schematic view of a vehicle and an environment according to some embodiments.

As shown in FIG. 1, a vehicle 10 on a roadway 14 that includes terrain 18 (e.g., an incline, a decline, turns, rough patches of roadway, etc.). The vehicle 10 can include a prime mover (e.g., a diesel engine), a drivetrain, an exhaust aftertreatment system, a control system and other vehicle systems that operate to control the vehicle 10 for travel along the roadway 14. In some embodiments, the vehicle 10 may be arranged for off-highway travel (e.g., in a wheel loader, excavator, or other vehicle/machinery).

Figure 2:
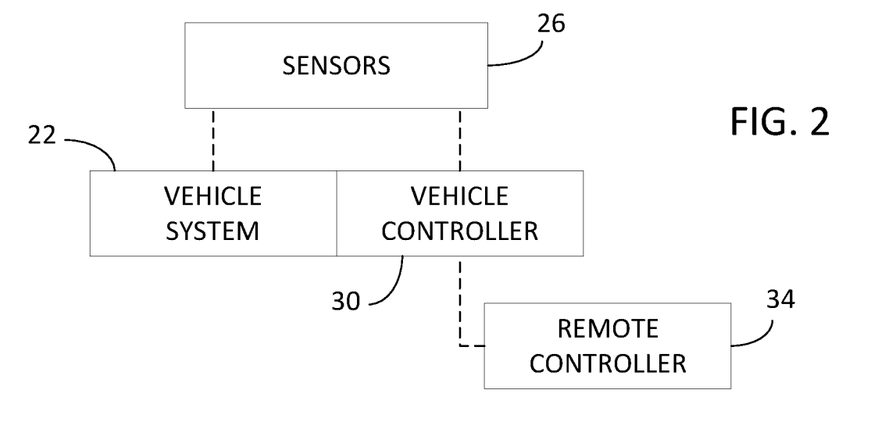
FIG. 2 is a schematic view of a vehicle system for the vehicle of FIG. 1 according to some embodiments.

As shown in FIG. 2, the vehicle 10 includes a vehicle system 22 (e.g., an engine, a transmission, a cruise control unit, an aftertreatment system, a smart suspension system, etc.), a sensor array 26 arranged to monitor the vehicle system 22 and the effects of changes enacted by the vehicle system 22, and a vehicle controller 30 arranged to receive inputs from the sensor array 26 and control various operations or actions of the vehicle system 22 based on the received inputs and a stored policy. In some embodiments, a remote controller 34 is coupled to and in communication with the vehicle controller 30 to update the stored policy based on inputs received from the sensor array 26 and other inputs (e.g., sensor inputs received on other vehicles, or from other information).

Figure 3:
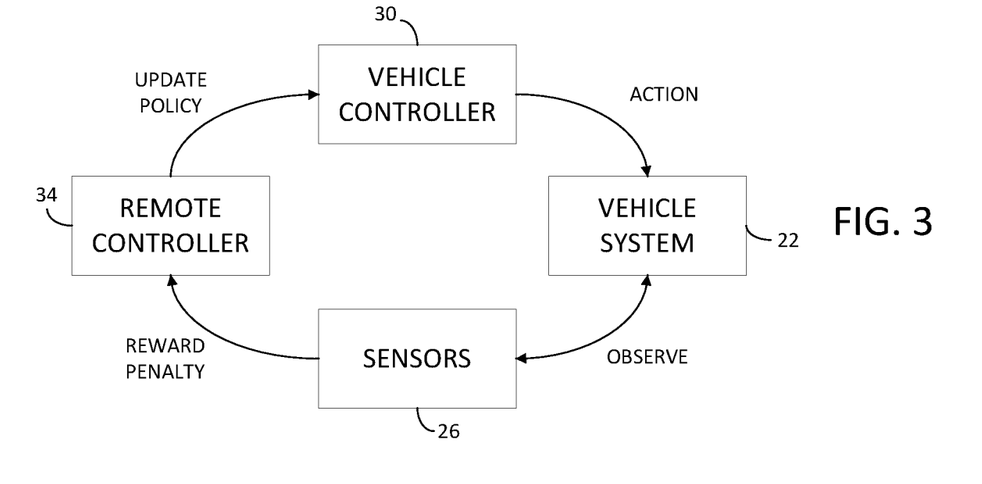
FIG. 3 is a flow chart showing a logic cycle for the vehicle system of FIG. 2 according to some embodiments.

In some embodiments, as shown in FIG. 3, the vehicle controller 30 is provided initially with a base policy for control of the vehicle system 22. In some embodiments, the base policy may be modeled on a preexisting control model, or a model determined via traditional calibration techniques (e.g., testing in a controlled environment). The vehicle controller 30 controls an action of vehicle system 22 according to the base policy and the sensor array 26 observes vehicle operational parameters relevant to the operation of the vehicle system 22. Based on the observed vehicle operational parameters, a reward or penalty is issued. In some embodiments, the reward or penalty is issued based on a threshold condition (e.g., a fuel economy above or below a threshold, an engine speed overshoot or undershoot, a gear shift timing, a NOx conversion efficiency, etc.). In some embodiments, the reward or penalty is issued based on look-up tables or matrixes of desirable results in various conditions. In some embodiments, the reward or penalty is issued based on one or more algorithms designed to optimize a set of parameters (e.g., speed control and fuel economy, NOx conversion efficiency and ammonia slip, etc.). In one embodiment, the reward or penalty is issued by the vehicle controller 30. In another embodiment, the reward or penalty is issued by the remote controller 34. In still another embodiment, the reward or penalty is issued by a combination of the vehicle controller 30 and the remote controller 34. For example, a decision matrix or database may be stored in a memory of the remote controller 34 and queried by the vehicle controller 30 using the inputs observed by the sensor array 26. The policy can be stored locally on the vehicle controller 30 and updated based on the feedback reward or penalty queried from the remote controller 34. Once the policy is updated in view of the reward or penalty, the vehicle controller 30 controls the vehicle system 22 based on the updated policy and the cycle of reinforcement learning continues.

Figure 4:
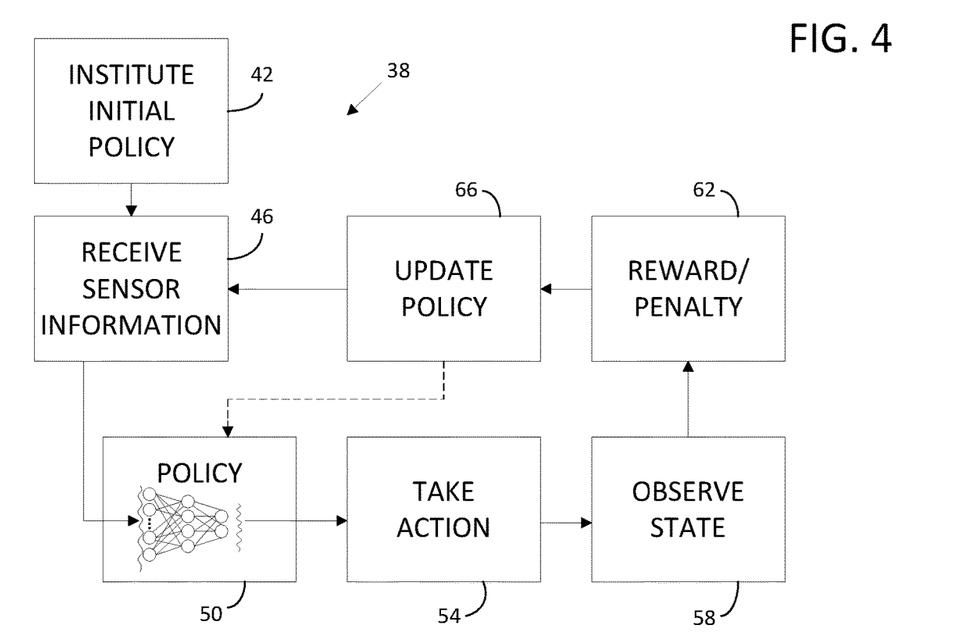
FIG. 4 is a flow chart showing a logic cycle for the vehicle system of FIG. 2 according to some embodiments.

As shown in FIG. 4, a method 38 includes instituting an initial or base policy at step 42. The base policy can be a best guess policy designed to control the vehicle system 22 close to a desired output (e.g., based on parameters used in previous similar vehicles or systems). The vehicle controller 30 then receives information from the sensor array 26 at step 46. The vehicle controller 30 determines system parameters based on the information (e.g., NOx conversion efficiency, vehicle speed, engine speed, engine torque, ammonia slip, etc.). The information or the determined system parameters are then input into the policy at step 50. In some embodiments, the inputs are provided to a deep neural network to determine an output. At step 54, the vehicle system 22 is controlled to take an action based on the output of the policy at step 50. In some embodiments, the action taken at step 54 is an exploratory action taken outside the normal scope of operation under the policy. Such exploratory actions may be executed during a calibration or learning period aimed to increase the speed and learning capabilities of the policy within the vehicle controller 30.

At step 58, a state of the vehicle system 22 is observed or determined and stored by the vehicle controller 30. In some embodiments, the observation at step 58 is completed by the sensor array 26. In some embodiments, the observation at step 58 is completed digitally based on other system parameters or effects within the vehicle controller 30 on other vehicle systems (e.g., based on one or more virtual sensors, or on a combination of information gathered from multiple sensors and combined within the controller 30). At step 62, a reward or penalty is issued based on the observed state from step 58. In some embodiments, determining the reward or penalty includes querying a remote database of stored outcomes. In some embodiments, determining the reward or penalty includes a comparison with thresholds or algorithms used to determine if the action taken in step 54 produced a desirable outcome. After the reward or penalty is recorded, the policy is updated at step 66 before the method 38 continues cyclically at step 46.

The updating of the policy at step 66 includes updating control parameters used for control of the vehicle system 22. For example, the policy may be a PID control scheme and the update to the policy may include updating one or more parameter of the PID. In some embodiments, the policy includes a neural network or a deep neural network and one or more levels of the neural network is adjusted or updated in view of the reward or penalty.

In some embodiments, the reward or penalty provided at step 62 can be provided by a human operator. For example, during a calibration mode, the policy can be updated in a continual nature according to the method 38, however, the action taken at step 54 is not carried out by the vehicle system 22. Rather, the human operator drives the vehicle, and the action taken by the vehicle controller at step 54 runs virtually and concurrently with the real-life operation by the human operator. If the policy enacted a virtual control action matching or substantially matching the real-life action taken by the human operator, then a reward is provided at step 62. In a human operator system, the policy is tuned until it can successfully mimic the operation by the human operator.

The descriptions of embodiments shown in FIGS. 1-4 can be accomplished with several different computational architectures. In one embodiment, the memory and computational power are locally positioned in the vehicle 10 so that the policy, the reward or penalty decisions, and the updating of the policy all take place locally with the vehicle 10. In another embodiment and as shown in FIGS. 2 and 3, the vehicle controller 30 communicates with the remote controller 34 in the form of a cloud computing network, a remote server, or within a fleet of vehicles. For example, a fleet of vehicles may all be providing information and policy updates to a remote controller 34 in the form of a central controller or server. The remote controller 34 then updates the policy based on all the information received from the fleet of vehicles and uploads the updated policy to the fleet of vehicles.

As the components of FIG. 1 are shown to be embodied in the vehicle 10, the vehicle controller 30 may be structured as one or more electronic control units (ECU). The vehicle controller 30 may be separate from or included with at least one of a transmission control unit, an exhaust aftertreatment control unit, a powertrain control module, an engine control module, etc. The function and structure of the vehicle controller 30 is described in greater detail in FIG. 5.

Figure 5:
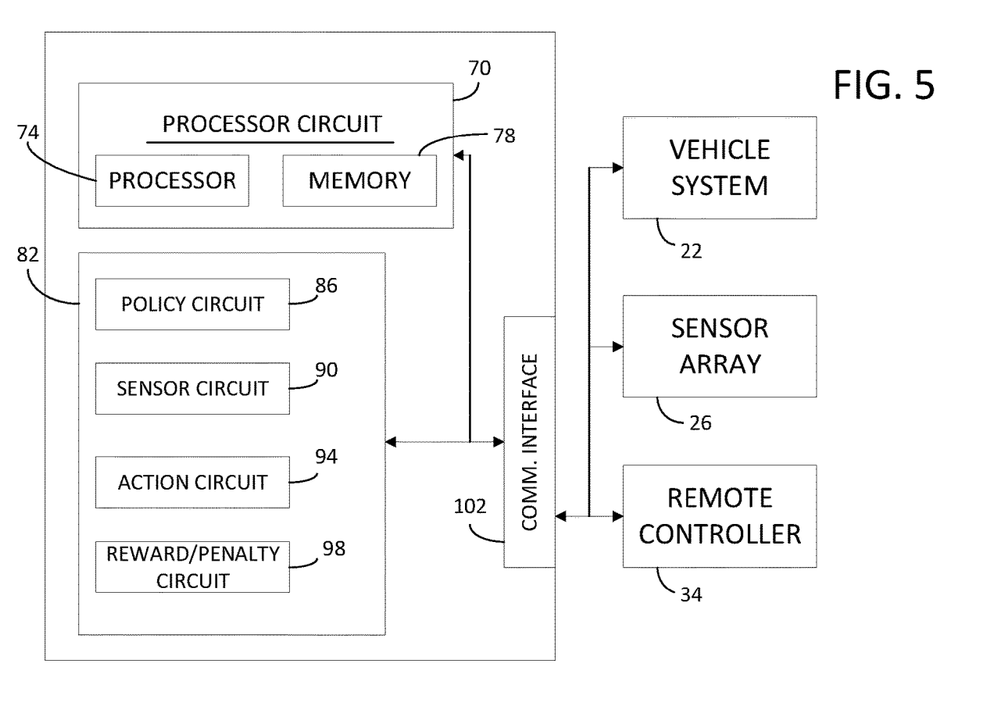
FIG. 5 is a schematic representation of a controller according to some embodiments.

Referring now to FIG. 5, a schematic diagram of the vehicle controller 30 of the vehicle 10 of FIG. 1 is shown according to an example embodiment. As shown in FIG. 5, the vehicle controller 30 includes a processing circuit 70 having a processor 74 and a memory device 78, a control system 82 having a policy circuit 86, a sensor circuit 90, an action circuit 94, and a reward/policy circuit 98, and a communications interface 102. Generally, the vehicle controller 30 is structured to institute an initial policy, instigate actions according to the policy and based on information received from the sensor array 26, and update the policy according to a reinforcement learning scheme (e.g., rewards and penalties). As the policy is updated control of the vehicle system 22 is improved over time.

In one configuration, the policy circuit 86, the sensor circuit 90, the action circuit 94, and the reward/policy circuit 98 are embodied as machine or computer-readable media that is executable by a processor, such as processor 74. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the remote processors may be connected to each other through any type of network (e.g., CAN bus, etc.).

In another configuration, the policy circuit 86, the sensor circuit 90, the action circuit 94, and the reward/policy circuit 98 are embodied as hardware units, such as electronic control units. As such, the policy circuit 86, the sensor circuit 90, the action circuit 94, and the reward/policy circuit 98 may be embodied as one or more circuitry components including, but not limited to, processing circuitry, network interfaces, peripheral devices, input devices, output devices, sensors, etc. In some embodiments, the policy circuit 86, the sensor circuit 90, the action circuit 94, and the reward/policy circuit 98 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the policy circuit 86, the sensor circuit 90, the action circuit 94, and the reward/policy circuit 98 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The policy circuit 86, the sensor circuit 90, the action circuit 94, and the reward/policy circuit 98 may also include programmable hardware devices such as field programmable gate arrays, programmable array logic, programmable logic devices or the like. The policy circuit 86, the sensor circuit 90, the action circuit 94, and the reward/policy circuit 98 may include one or more memory devices for storing instructions that are executable by the processor(s) of the policy circuit 86, the sensor circuit 90, the action circuit 94, and the reward/policy circuit 98. The one or more memory devices and processor(s) may have the same definition as provided below with respect to the memory device 78 and processor 74. In some hardware unit configurations, the policy circuit 86, the sensor circuit 90, the action circuit 94, and the reward/policy circuit 98 may be geographically dispersed throughout separate locations in the vehicle. Alternatively and as shown, the policy circuit 86, the sensor circuit 90, the action circuit 94, and the reward/policy circuit 98 may be embodied in or within a single unit/housing, which is shown as the vehicle controller 30.

In the example shown, the vehicle controller 30 includes a processing circuit 70 having a processor 74 and a memory device 78. The processing circuit 70 may be structured or configured to execute or implement the instructions, commands, and/or control processes described herein with respect to policy circuit 86, the sensor circuit 90, the action circuit 94, and the reward/policy circuit 98. The depicted configuration represents the policy circuit 86, the sensor circuit 90, the action circuit 94, and the reward/policy circuit 98 as machine or computer-readable media. However, as mentioned above, this illustration is not meant to be limiting as the present disclosure contemplates other embodiments where the policy circuit 86, the sensor circuit 90, the action circuit 94, and the reward/policy circuit 98, or at least one circuit of the policy circuit 86, the sensor circuit 90, the action circuit 94, and the reward/policy circuit 98, is configured as a hardware unit. All such combinations and variations are intended to fall within the scope of the present disclosure.

The processor 74 may be implemented as one or more general-purpose processor, an application specific integrated circuit (ASIC), one or more field programmable gate arrays (FPGAs), a digital signal processor (DSP), a group of processing components, or other suitable electronic processing components. The one or more processors may be shared by multiple circuits (e.g., the policy circuit 86, the sensor circuit 90, the action circuit 94, and the reward/policy circuit 98 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 78 (e.g., RAM, ROM, Flash Memory, hard disk storage, etc.) may store data and/or computer code for facilitating the various processes described herein. The memory device 78 may be communicably coupled to the processor 74 to provide computer code or instructions to the processor 74 for executing at least some of the processes described herein. Moreover, the memory device 78 may be or include tangible, non-transient volatile memory or non-volatile memory. Accordingly, the memory device 78 may include database components, object code components, script components, or any other type of information structure for supporting the various activities and information structures described herein.

The policy circuit 86 is structured to communicate with the memory device 78 to retrieve the policy and to enact control of the vehicle system 22 according to the policy. The policy circuit 86 is communicably coupled to the sensor circuit 90 and receives information therefrom in the form of inputs. The policy circuit 86 introduces the inputs into the policy and determines outputs. The outputs are provided via the communication interface 102 to the vehicle system 22. The policy circuit 86 is also structured to receive reward or penalty signals (e.g., values, data, information, messages, etc.) from the reward/policy circuit 98 and update the policy based on the received reward or penalty signals. In some embodiments, the reward or penalty signals are determined and/or created locally within the vehicle controller 30. Additionally, the policy can be updated locally within the policy circuit 86.

In some embodiments, the policy circuit 86 is structured to receive updated policy information from the remote controller 34 via the communication interface 102. In some embodiments, the policy circuit 86 is structured to package the current policy and reward or penalty signals, and/or other information into one or more data packets and communicate with the remote controller 34 via the communication interface 102. The remote controller 34 may then analyze and update the policy and return an updated policy to the policy circuit 30 for use in the vehicle 10. As discussed above, the remote controller 34 may include a cloud computing solution and may therefore include more than one individual controller acting in concert to update or improve the policy. For example, the policy circuit 86 may act as a part of a cloud computing solution for other vehicles and therefore is enabled to compute updated policy information for other vehicles based on information received from the sensor circuit 90 and/or the reward/penalty circuit 98, or from other information received via the communication interface 102.

The sensor circuit 90 is structured to receive and process information received from the sensor array 26 via the communication interface 102. In some embodiments, the sensor circuit 90 includes one or more virtual sensors arranged to determine operational parameters based on one or more related sensor signals. The sensor circuit 90 communicates with the policy circuit 86 and the reward/penalty circuit 98.

The action circuit 94 is structured to receive the policy from the policy circuit 94 and enact actions within the vehicle system 22 in order to learn how the vehicle system 22 responds. The actions prompted by the action circuit 94 are dictated by the policy and are based on the inputs received from the sensor circuit 90. In some embodiments, the action circuit 94 may function in an experimental or exploratory mode wherein actions outside the scope of the current policy are enacted and the reward/penalty circuit 98 provides feedback to the policy circuit 86 based on the result of the exploratory actions.

The reward/penalty circuit 98 is structured to observe the actions taken by the action circuit 94, and the information provided by the sensor circuit 90 and provide a reward signal or a penalty signal to the policy circuit 86 based on the outcome of the action. In some embodiments, the reward/penalty circuit 98 queries lookup tables, or matrixes saved in the memory device 78 or in the remote controller 34 to determine if a reward signal or a penalty signal should be sent. In some embodiments, the reward/penalty circuit 98 receives input from a human operator or observer. For example, the reward/penalty circuit 98 may monitor the real-life actions of a human operator and compare the actions taken by the action circuit 94 to the real-life actions. For example, in a cruise control application, the policy may take actions virtually that are compared to the actions of a real-life human operator that is maintaining a desired vehicle speed or meeting a desired outcome. If the policy dictated a virtual action via the action circuit 94 that matches the real-life action taken by the human operator, a reward signal is sent.

Data Driven models (or model free approaches) implemented by the vehicle controller 30 can be used to replace and/or augment existing control strategies. Typical vehicle controllers approximate dynamic models as linear functions that may not capture the actual vehicle behavior successfully and can lead to poor performance. Reinforcement learning within the vehicle controller 30 can utilize deep learning models to capture non-linear models to a high precision, resulting in improved performance.

The control models discussed above reduce the tuning and calibration effort by utilizing real world data. Typical calibration techniques model vehicle system 22 behavior only in steady-state conditions. However, during transient conditions the vehicle system 22 is controlled to meet a specific objective (e.g., smoke or torque response of an engine) and other performance variables such as fuel consumption are typically given less importance and therefore are not optimized during transient operation. Reinforcement Learning and/or Deep learning within the vehicle controller 30 can optimally meet all or many performance indexes based on the data and also reduces calibration effort.

The above control models are adaptable in nature. Typical calibration techniques utilized currently rely on a human calibrating and optimizing offline and plugging values into an engine control module (ECM) for engine operation. These techniques utilize data collected in a controlled calibration environment and include post processing of the collected data for calibration and/or optimization. However, real operating conditions can be totally different from the conditions during calibration. For example, operating conditions can change significantly over time as components and vehicle systems age. Reinforcement learning control processes within the vehicle controller 30 utilize online or real-time optimization with data collected in real conditions to calibrate and optimize the parameters which can adapt to the change in operating condition without any need to re-calibrate manually. Additionally, when the vehicle system 22 runs in a non-calibration condition (e.g., normal operation), the vehicle controller 30 can continue to learn and/or calibrate relevant parameters and the updated policy due to the adaptive nature of reinforcement learning algorithms.

Other approaches such as model predictive control (MPC) can be computationally expensive for high dimensional problems solved over longer horizon. Reinforcement learning within the vehicle controller 30 can mimic the behavior of such complex controllers and is computationally efficient in real time.

Figure 6:
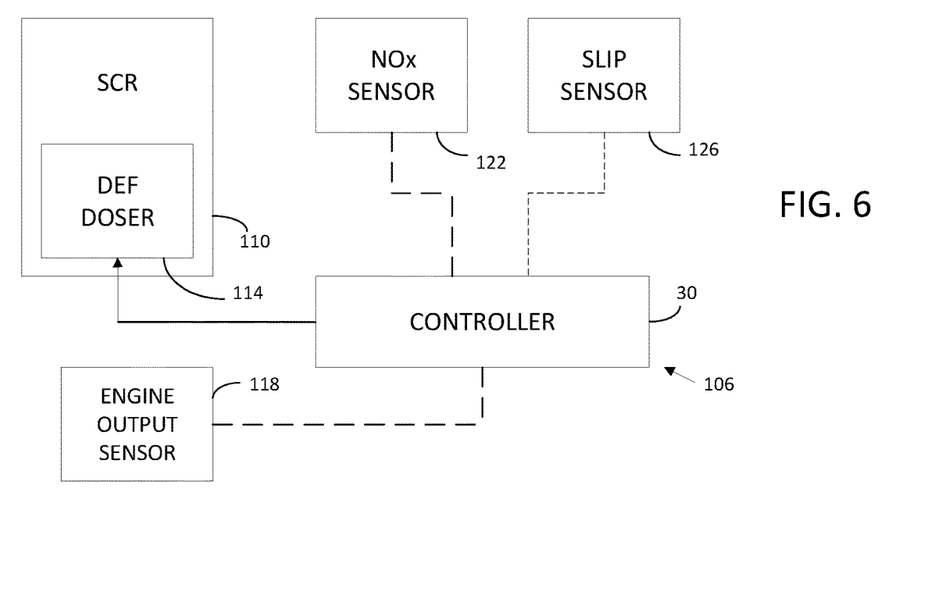
FIG. 6 is a schematic view of an aftertreatment system for a vehicle according to some embodiments.

As shown in FIG. 6, the systems described above, and in particular the vehicle controller 30, can be integrated into an exhaust gas aftertreatment system 106 including a selective catalyst reduction system (SCR) 110 including a diesel exhaust fluid (DEF) doser 114. The DEF doser 114 is structured to introduce an aqueous urea solution into a catalyst to reduce NOx in an exhaust gas stream. The aftertreatment system 106 also includes an engine output sensor 118, a NOx sensor 122, and an ammonia slip sensor 126. As discussed above, the engine output sensor 118, the NOx sensor 122, and the ammonia slip sensor 126 can be physical or virtual sensors (e.g., information indicative of a system parameter that is determined based on algorithms and/or based on multiple sensor inputs). The controller 30 is structured to determine an engine output parameter (e.g., an exhaust gas temperature exiting an engine) using the engine output sensor 118, an exhaust exit NOx level and/or a NOx conversion efficiency using the NOx sensor 122, and an ammonia slip parameter using the ammonia slip sensor 126.

The vehicle controller 30 is arranged with the goal of maximizing fuel efficiency while maintaining NOx output and ammonia slip below target thresholds. The policy circuit 86 institutes a base policy and the aftertreatment system 106 is operated according to the base policy. For example, the base policy can include a PID control scheme based on "a best guess" PID control scheme. In some embodiments, the base control policy can be a PID, proportional controllers, model predictive control, fuzzy logic, etc. As the aftertreatment system reacts to inputs from the sensors 118, 122, 126 the policy enacts actions via the action circuit 94 and the reward/penalty circuit 98 observes the affects and provides reward signals and penalty signals back to the policy circuit 86. The resulting reward signals and penalty signals can be used to develop a neural network, a deep neural network, or other networks and/or learning policy schemes that replace the base policy over time. In this way, the policy is continually updated and improved to control operation of the DEF doser 114 and improve operation of the aftertreatment system 106 based on real world information. Over time, the policy can be continually or periodically updated to account for aging components or new roadways 14 or environments. In some embodiments, the sensor array 26 includes other sensors and provides other inputs to the vehicle controller 30 to aid in the control and operation of the DEF doser 114 or other components of the SCR 110.

Figure 7:
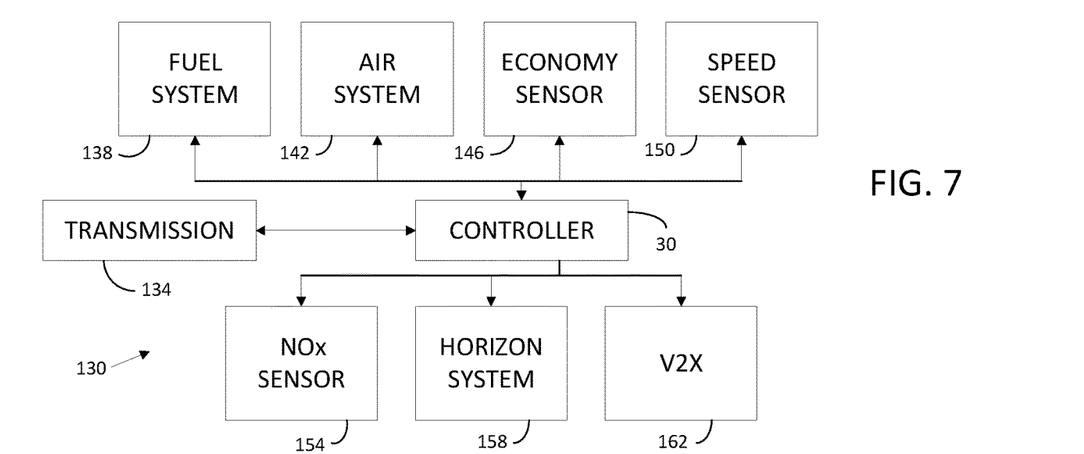
FIG. 7 is an engine control system for a vehicle according to some embodiments.

As shown in FIG. 7, a cruise control system 130 includes the vehicle controller 30, a transmission or transmission control unit 134, a fuel system 138, an air handling system 142, an economy sensor 146, a speed sensor 150, a NOx sensor 154, a horizon system 158, and a vehicle-to-X (V2X) system 162. In some embodiments, the horizon system 158 includes the V2X system 162 and/or other look-ahead systems that allow the vehicle controller 30 to better understand upcoming conditions or other factors relevant to the vehicle or a fleet of vehicles. The vehicle controller 30 is coupled to the system components to affect operation of the transmission control unit 134, the fuel system 138, and the air handling system 142 in order to control engine and transmission operation to maintain vehicle speed while meeting desirable parameters (e.g., NOx out, engine temperature, etc.). The transmission control unit 134 is structured to control operation of the transmission and the particular gear setting that the transmission is operating in. The fuel system 138 and air handling system 142 affect the operation of an engine coupled to the transmission for producing power. The economy sensor 146 is structured to provide a fuel efficiency signal to the vehicle controller 30. The speed sensor 150 is structured to provide a speed signal to the vehicle controller indicative of a vehicle speed. The NOx sensor 154 is structured to provide a NOx signal to the vehicle controller 30 indicative of an exhaust gas output NOx level. The horizon system 158 includes maps or routes stored in the memory device 78 or in a cloud storage that can be utilized by the vehicle controller 30 to determine upcoming inclines, declines, distances, turns, speed limits, and/or other factors of a look-ahead route. The V2X system 162 provides communication between vehicles in a fleet, and/or with the remote controller 34 such that telematics solutions such as route information, traffic conditions, and/or other inputs can be shared within a fleet of vehicles.

The cruise control system 130 utilizes the reinforcement learning capabilities of the vehicle controller 30 to improve the accuracy and performance of a cruise control operation with the goal of maintaining vehicle speed, while reducing emissions, and maximizing fuel efficiency. The iterative tuning of the policy allows the vehicle controller 30 to learn how inputs from the horizon system 158 including upcoming inclines and declines affect how speed control can be implemented through actuation of the transmission control unit 134, the fuel system 138, and the air handling system 142. For example, the vehicle controller 30 may learn that less fuel is required when a decline is upcoming within a predetermined distance. Another example includes a determination by the vehicle controller 30 of an altitude of operation and control of the engine can be modified or tuned to the specific current altitude to provide an improved fuel efficiency and/or emissions output. The degree of the grade, the length of the decline, and other factors (e.g., traffic information received from the V2X system 162) can be used to improve the cruise control system's 130 response and provide a maximized fuel economy while maintaining acceptable emissions levels and maintaining the vehicle speed within a predetermined bandwidth.

The integration of the machine learning within the vehicle controller 30 or within a remote controller associated with the vehicle controller 30 allows the vehicle to provide better performance (e.g., lower emissions, better fuel economy, more torque, more stable speed control with the cruise control system, more efficient use of an aftertreatment system, increased longevity of the engine or transmission, etc.). In some embodiments, the vehicle controller 30 is able to tune the engine, transmission, or another vehicle system continually and in real time so that performance of the vehicle system is maintained over time. Traditional vehicle systems only include tuning at initial commissioning or at spaced apart service intervals. Therefore, the vehicle controller 30 provides a significant advantage over systems that rely on human interaction to tune or update the policy of the vehicle system. Continued updating of the policy allows the vehicle system to achieve improved performance over the life of the vehicle system when compared with traditional systems that do not utilize machine learning techniques. For example, as vehicle systems age, age information can be used to update the policy and provide improved performance over the life of the vehicle or vehicle system as the performance characteristics of the vehicle or vehicle system change with age. In some embodiments, the vehicle controller 30 utilizes machine learning techniques to control a vehicle system in view of look ahead or horizon information so that the policy accounts for future conditions (e.g., on a roadway) that can include altitude, road grade, turn angle, speed limit changes, traffic, road construction, etc. Additionally, fleet information can be used to update the policy such that a first vehicle can benefit from the experiences of a second vehicle over time. The policy of the first vehicle can be updated in view of information collected by the second vehicle. For example, the policy of the first vehicle can be updated over time based on the aging experience of the second older vehicle. In this way, the policy of the first vehicle can account for aging components over time to maintain an improved vehicle operation. These and other embodiments of the vehicle controller 30 allow for improved operation and tuning via an updating policy. Systems that are reliant on static tuning at discrete time intervals are not able to provide improved operation over time or operation that adapts to changing environments, and/or fleet interaction.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 5, it should be understood that the vehicle controller 30 may include any number of circuits for completing the functions described herein. For example, the activities and functionalities of the circuits 86-98 may be combined in multiple circuits or as a single circuit. Additional circuits with additional functionality may also be included. Further, the vehicle controller 30 may further control other activity beyond the scope of the present disclosure.

As mentioned above and in one configuration, the "circuits" may be implemented in machine-readable medium for execution by various types of processors, such as processor 74 of FIG. 5. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential parameters. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
a sensor array structured to provide sensor information indicative of an operating parameter regarding operation of a diesel exhaust fluid doser of a vehicle, the diesel exhaust fluid doser structured to introduce an aqueous urea solution for use by a selective catalyst reduction (SCR) catalyst to reduce NOx in an exhaust gas stream; and
a processing circuit coupled to the sensor array, the processing circuit comprising one or more memory devices coupled to one or more processors, the one or more memory devices configured to store instructions thereon that, when executed by the one or more processors, cause the one or more processors to:
store, in the one or more memory devices, a machine learning model for controlling operation of the diesel exhaust fluid doser of the vehicle;
receive the sensor information regarding the operation of the diesel exhaust fluid doser of the vehicle from the sensor array;
receive horizon information indicative of at least one upcoming road condition;
input the sensor information and the horizon information into the machine learning model;
determine an output of the machine learning model based on the input of the sensor information and the horizon information, the output of the machine learning model indicative of a control action for controlling the diesel exhaust fluid doser of the vehicle;
control the operation of the diesel exhaust fluid doser of the vehicle according to the control action indicated by the output of the machine learning model;
compare the sensor information received after controlling the operation of the diesel exhaust fluid doser of the vehicle according to the control action indicated by the output of the machine learning model to a desired value of the operating parameter regarding a reward or penalty condition;
provide one of a reward signal or a penalty signal in response to the comparison;
update the machine learning model based on receipt of the reward signal or the penalty signal; and
control the diesel exhaust fluid doser of the vehicle using the updated machine learning model to improve operation in view of the operating parameter.

2. The system of claim 1, wherein the one or more memory devices are located in the vehicle.

3. The system of claim 1, wherein the horizon information includes look ahead information including at least one of an altitude, a grade, or a turn degree information.

4. The system of claim 1, wherein the instructions, when executed by the one or more processors, cause the one or more processors to receive fleet information from other vehicles, and utilize the fleet information to update the machine learning model.

5. The system of claim 1, wherein the instructions, when executed by the one or more processors, further cause the one or more processors to determine an age of an engine component and update the machine learning model using the age of the engine component.

6. A system comprising:
a diesel exhaust fluid doser of a vehicle structured to introduce an aqueous urea solution for use by a selective catalyst reduction (SCR) catalyst to reduce NOx in an exhaust gas stream;
a sensor array coupled to the diesel exhaust fluid doser of the vehicle, the sensor array structured to provide sensor information of an operating parameter regarding operation of the diesel exhaust fluid doser of the vehicle; and
a processing circuit comprising one or more memory devices coupled to one or more processors, the one or more memory devices configured to store instructions thereon that, when executed by the one or more processors, cause the one or more processors to:
store, in the one or more memory devices, a machine learning model for controlling the operation of the diesel exhaust fluid doser of the vehicle;
receive the sensor information regarding the operation of the diesel exhaust fluid doser of the vehicle from the sensor array;
receive age information indicating an operational age of the diesel exhaust fluid doser of the vehicle;
input the sensor information and the age information into the machine learning model;
determine an output of the machine learning model based on the input of the sensor information and the age information, the output of the machine learning model indicative of a control action for controlling the diesel exhaust fluid doser of the vehicle;
control the operation of the diesel exhaust fluid doser of the vehicle according to the control action indicated by the output of the machine learning model;
compare the sensor information received after controlling the operation of the diesel exhaust fluid doser of the vehicle according to the control action indicated by the output of the machine learning model to a desired value of the operating parameter regarding a reward or penalty condition;
provide one of a reward signal or a penalty signal in response to the comparison; and
update the machine learning model based on receipt of the reward signal or the penalty signal.

7. The system of claim 6, wherein the age information includes a historical age based on performance information.

8. The system of claim 6, wherein the age information is saved to the one or more memory devices and provided to a second vehicle system associated with a different vehicle.

9. The system of claim 6, wherein the age information is updated in real time by the one or more processors.

10. The system of claim 6, wherein the one or more memory devices are located within the vehicle.

11. The system of claim 6, wherein the age information is received from a look up table, and wherein the look up table is queried using the sensor information by the one or more processors.

12. The system of claim 6, wherein the sensor information includes horizon information indicative of upcoming roadway conditions.

\* \* \* \* \*